(12) United States Patent
Kanjanapitak

(10) Patent No.: US 9,538,048 B2
(45) Date of Patent: Jan. 3, 2017

(54) COMPUTER READABLE MEDIUM AND COMPUTERIZED METHOD OF DETERMINING WHETHER PORTIONS OF A VIDEO ARE PART OF A CONTINUOUS VIDEO SEGMENT

(75) Inventor: Kantavit Kanjanapitak, Miami, FL (US)

(73) Assignee: Primestream Corp., Miami, FL (US)

( * ) Notice: Subject to any disclaimer, the term of this patent is extended or adjusted under 35 U.S.C. 154(b) by 1332 days.

(21) Appl. No.: 12/797,224

(22) Filed: Jun. 9, 2010

(65) Prior Publication Data

US 2011/0199540 A1  Aug. 18, 2011

Related U.S. Application Data

(60) Provisional application No. 61/305,064, filed on Feb. 16, 2010.

(51) Int. Cl.
*H04N 11/02* (2006.01)
*H04N 5/14* (2006.01)
*G11B 27/28* (2006.01)
*G11B 27/32* (2006.01)

(52) U.S. Cl.
CPC .............. *H04N 5/147* (2013.01); *G11B 27/28* (2013.01); *G11B 27/323* (2013.01)

(58) Field of Classification Search
USPC ....................................... 375/240.16; 348/571
See application file for complete search history.

(56) References Cited

U.S. PATENT DOCUMENTS

| 4,340,916 | A | | 7/1982 | Menezes |
| 4,538,188 | A | | 8/1985 | Barker et al. |
| 4,835,626 | A | | 5/1989 | Wilkinson et al. |
| 4,979,050 | A | | 12/1990 | Westland et al. |
| 5,023,727 | A | * | 6/1991 | Boyd et al. .................... 386/338 |
| 5,218,672 | A | | 6/1993 | Morgan et al. |
| 5,428,774 | A | | 6/1995 | Takahashi et al. |
| 6,044,197 | A | | 3/2000 | Smith et al. |
| 6,058,236 | A | | 5/2000 | Peters et al. |
| 6,404,711 | B1 | | 6/2002 | Kato |
| 6,452,875 | B1 | | 9/2002 | Lee et al. |
| 6,731,862 | B1 | * | 5/2004 | Kawai et al. .................. 386/286 |
| 6,779,079 | B2 | | 8/2004 | Hirose et al. |

(Continued)

FOREIGN PATENT DOCUMENTS

JP  2005108312 A  4/2005

*Primary Examiner* — Leron Beck
(74) *Attorney, Agent, or Firm* — Laurence A. Greenberg; Werner H. Stemer; Ralph E. Locher

(57) ABSTRACT

A computerized method is used to determine whether portions of a video are part of a continuous video segment. The method includes identifying a time code break in a plurality of time codes of a video by having a computing device examine the plurality of time codes of the video. The method also includes determining whether a first portion of the video located before the time code break and a second portion of the video located after the time code break are part of a continuous video segment by having a computing device examine the expected time code of the first frame of the second portion of the video and a location of the second portion of the video with respect to a location of the first portion of the video. A computer readable medium stores a set of computer executable instructions for performing the method.

20 Claims, 6 Drawing Sheets

(56) References Cited

U.S. PATENT DOCUMENTS

| | | |
|---|---|---|
| 7,466,334 B1 | 12/2008 | Baba |
| 2003/0185541 A1* | 10/2003 | Green .......................... 386/46 |
| 2005/0183018 A1 | 8/2005 | Shinkai et al. |

* cited by examiner

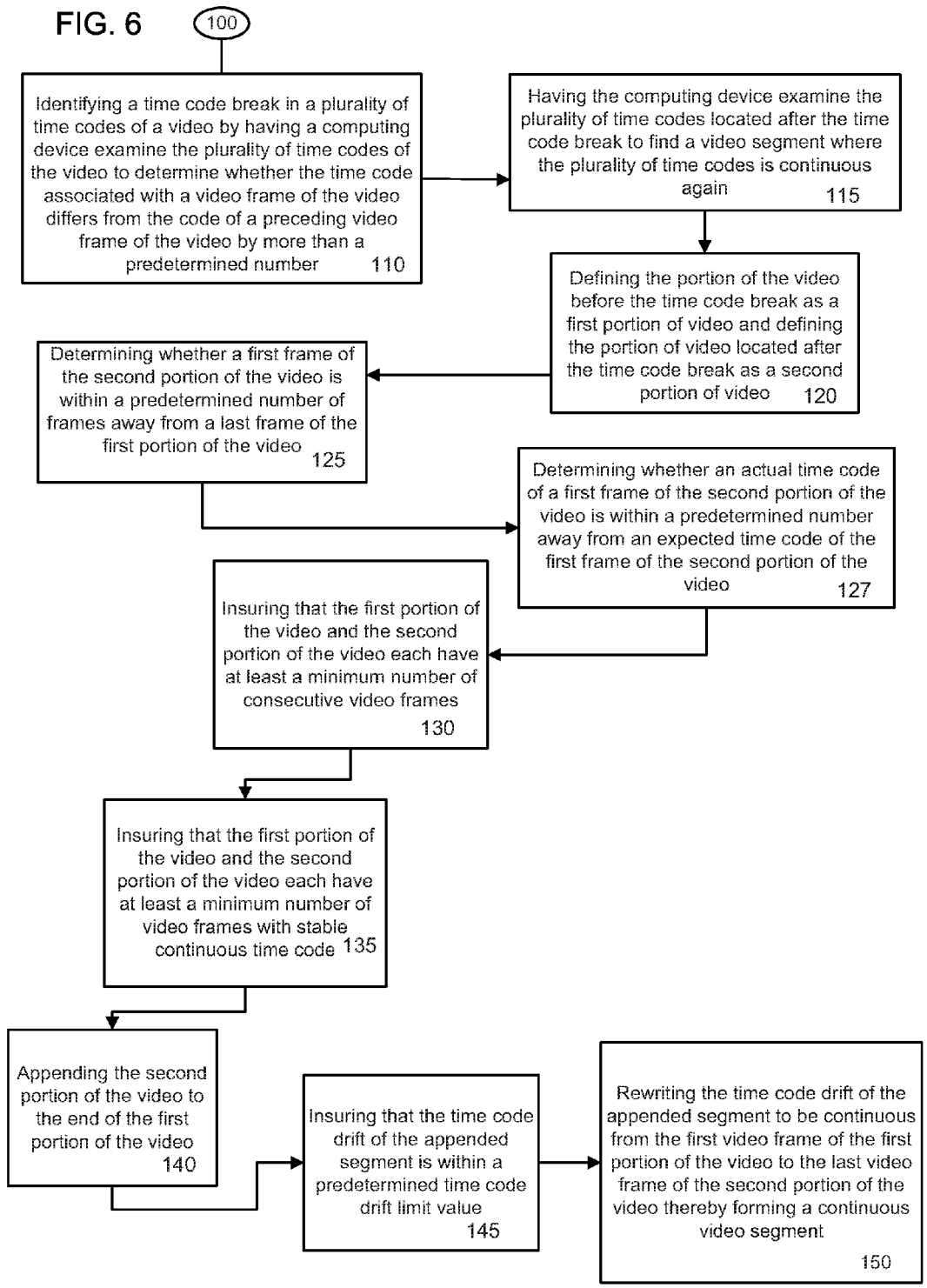

COMPUTER READABLE MEDIUM AND COMPUTERIZED METHOD OF DETERMINING WHETHER PORTIONS OF A VIDEO ARE PART OF A CONTINUOUS VIDEO SEGMENT

CROSS-REFERENCE TO RELATED APPLICATION

This application claims the benefit under 35 U.S.C. §119(e) of my provisional application No. 61/305,064 filed Feb. 16, 2010. As far as possible under the rules, the prior application is herewith entirely incorporated by reference.

BACKGROUND OF THE INVENTION

Field of the Invention

The invention relates to a computerized method of determining whether portions of a video are part of the same continuous video segment. The invention also relates to a computer readable medium having computer-executable instructions for performing the method.

Description of the Related Art

Typically, a person will determine whether there is a discontinuity in recorded video content by manually inspecting the actual video content of consecutive frames of the video content. This person will also manually inspect the video content of the portions of video before and after the discontinuity in order to determine whether the portions are part of the same continuous video segment or whether they are unrelated video portions that probably should not be combined.

BRIEF SUMMARY OF THE INVENTION

It is an object of the invention to program a computing device, for example, a personal computer, to determine whether portions of a video are part of the same continuous video segment or whether these portions are distinct and unrelated portions of video. The computing device is programmed to first examine the time codes that are associated with the video frames of the video in order to find locations where the time code is discontinuous. Such discontinuous portions of time code are referred to as time code breaks. The computing device is also programmed to determine whether the video portions that are separated by a time code break are part of the same continuous video segment.

It is known to record time codes on a recording media, for example, video tape, or digital video disk, along with the recorded video content. In order to give a basic overview of some causes of time code breaks, a few examples will be discussed. Time code breaks can occur when an operator of a video tape recorder switches off the video tape recorder after recording live video and then subsequently switches the video tape recorder back on to record more live video content. In the previously discussed situation, there will typically be a time code break due to slack and/or unloading of the video tape. A time code break will also result if an operator of a video tape recorder rewinds a video tape with recorded video content and then records additional video content. A time code break may also result when the video recorder is paused during recording since this typically causes a jump in the time code at the location where the tape was paused. Depending on the particular type of recording device used to record live video, pausing the recording device may result in a gap in the time code, i.e. missing time code. Radio-frequency (RF) interference may disrupt the time code track resulting in missing time codes or may cause the time codes to pause. Problems in the time code may also be present in old types of recording media or in recording media that has been stored for long periods of time. For example, the time code signal may become weak or might be totally lost for a single frame or for as long as a few seconds of recorded video.

With the foregoing and other objects in view there is provided, in accordance with the invention, a computerized method of determining whether portions of a video are part of a continuous video segment. The method includes identifying a time code break in a plurality of time codes of a video by having a computing device examine the plurality of time codes of the video. The method also includes having the computing device determine whether a first portion of the video located before the time code break and a second portion of the video located after the time code break are part of the same continuous video segment by examining the time codes of the video, and by also examining the location of the second portion of the video with respect to other portions of the video. If the time code of the first frame of the second portion of the video is close enough to the expected time code of the first frame of the second portion of the video (within a predetermined number away from the expected time code), and if the first frame of the second portion of the video is not too far away from the last frame of the first portion of the video, it is likely that the second portion of the video is a continuation of the video content of the first portion of the video. In other words, the first portion of the video and the second portion of the video are part of the same continuous video segment.

With the foregoing and other objects in view there is also provided, in accordance with the invention, a computer readable medium storing a set of computer executable instructions for performing the computerized method of determining whether portions of a video are part of a continuous video segment.

Other features which are considered as characteristic for the invention are set forth in the appended claims.

Although the invention is illustrated and described herein as embodied in a computerized method of determining whether portions of a video are part of the same continuous video segment, and in a computer readable medium storing a set of computer executable instructions for performing the method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIG. 6 is a flow chart illustrating the steps of an exemplary embodiment of the method.

DESCRIPTION OF THE PREFERRED EMBODIMENTS OF THE INVENTION

It should be understood that the invention is not limited to use with any particular type of time codes, any particular type of recording media, or any particular type of device for reading or obtaining the time codes. A few non-limiting examples of recording media include video tape and digital video disk. A few non-limiting examples of time codes include linear time code (LTC), vertical interval time code (VITC), and file based time code where the data is correlated to each specific field of video. One non-limiting example of a device that can be used to read time codes includes a video tape recorder (VTR). The time codes could also be obtained from a satellite signal, for example, as the video is being captured and transmitted from one location via the satellite signal and recorded elsewhere. The only important feature is that the time codes, from whatever source and in whatever form, are supplied to a computing device to be examined and analyzed.

Figure 2:
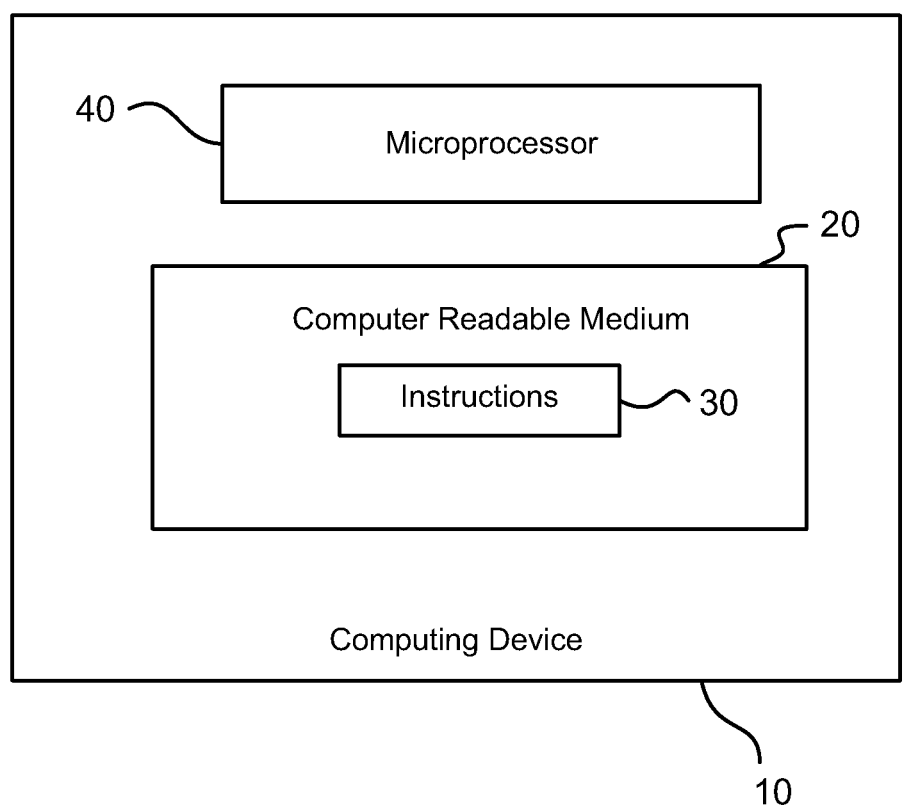
FIG. 2 is a block diagram of a computer.

FIG. 2 is a block diagram of a computing device 10 that can be used to perform the embodiments of the computerized method that will be described below. The computing device 10 can be a single computing device or may include several computing devices. Just to give a few non-limiting examples, the computing device 10 could include a widely distributed commercially available personal computer or could include a more specialized computer workstation. A set of computer-executable instructions 30 for performing the computerized method can be stored on a computer readable medium 20. The computer-executable instructions 30 are executed by a microprocessor 40 of the computing device 10 such that the computing device 10 performs at least one embodiment of the computerized method that will be described below. The computer readable medium 20 could be a portable medium, such as a CD (compact disk) or a portable memory stick that is read by the computing device 10 when inserted into an appropriate port or peripheral device of the computing device 10. The computer readable medium 20 could alternatively be an integral part of the computing device 10, such as a hard drive or a semiconductor memory, for example, a FLASH memory, a well known type of Random Access Memory or a well known type of Read Only Memory. The computing device 10 may obtain the signal containing the time codes from any of a variety of suitable devices, for example, a video tape recorder or a satellite.

Figure 1:
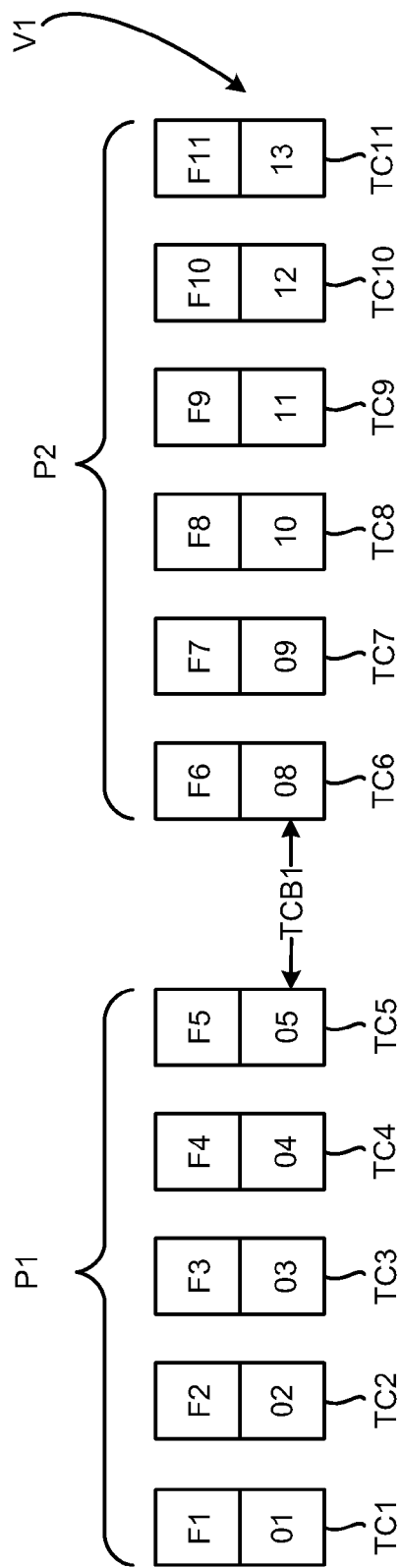
FIG. 1 is a schematic diagram of a plurality of video frames of a video.

FIG. 1 shows a schematic diagram of a plurality of video frames F1-F11 of a video V1. Each of the video frames F1-F11 is associated with a respective one of the time codes TC1-TC11. The computing device 10 shown in FIG. 2 is programmed by computer executable instructions 30 to examine the time codes TC1-TC11 of the video frames F1-F11 of the video V1, which is schematically shown in FIG. 1, in order to determine whether one or more time code breaks, such as time code break TCB1, exist. Since there is an expected difference of only one time period between the time codes of two consecutive video frames, in this example, the computing device 10 is programmed to determine that a time code break exists if one of the time codes TC1-TC11 increases by more than one time period from one video frame to the next video frame. Referring to the time codes TC1-TC11 of the video frames F1-F11 of the video V1 shown in FIG. 1, it is seen that the time code TC6 is 08 and the time code TC5 is 05. The time code TC6, which is associated with video frame F6, differs from the time code TC5, which is associated with video frame F5, by three time periods. Since three time periods is greater than the expected difference of only one time period between the time codes TC6 and TC5, the computing device 10 will identify a time code break TCB1 between video frames F6 and F5.

In order to account for unique time code progressions that may result from using old media, video pull down, or various frame rate conversion processes, the computing device 10 could be programmed to determine whether the difference between the time codes of two adjacent video frames is greater than an adjustable variable that has been set to a predetermined number. An operator will set the adjustable variable to the predetermined number before computing device 10 determines whether a time code break exists. The operator could set the predetermined number to be equal to one or to be equal to a number that is greater than one.

Let us consider some examples where the computing device 10 examines the time codes TC1-TC11 of the video V1 shown in FIG. 1. The computing device 10 could be programmed to identify a time code break by determining whether the difference between the time codes of two adjacent video frames is greater than the predetermined number. Since the expected time period difference in the time codes of two adjacent video frames is one, typically the operator will set the predetermined number to be equal to one. When the predetermined number is set equal to one, the computer executable instructions 30 will cause the computing device 10 to identify a time code break TCB1 between video frame F5 and video frame F6 since the time code difference between time code TC6 and time code TC5 is greater than the predetermined number, i.e. [08–05>1].

The operator may, for some reason, choose to set the predetermined number to a number greater than two. As mentioned above, this reason may be to account for unique time code progressions that may result from using old media, video pull down, or various frame rate conversion processes. If the operator sets the predetermined number equal to two and the computing device 10 evaluates the time codes TC1-TC11 of the video V1 shown in FIG. 1, the computing device 10 will still identify a time code break TCB1 between video frame F5 and video frame F6 since the time code difference between time code TC6 and time code TC5 is greater than the predetermined number, i.e. [08–05>2]. If however, the operator sets the predetermined number equal to three and the computing device 10 evaluates the time codes TC1-TC11 of the video V1 shown in FIG. 1, the computing device 10 will not identify a time code break TCB1 between video frame F5 and video frame F6 since the time code difference between time code TC6 and time code TC5 is not greater than the predetermined number, i.e. [08–05 is not greater than 3]. Since a time code break has not been identified in this situation, the video frames F1-F11 of video V1 will be considered to be one continuous video segment.

When the computing device 10 is programmed to examine the time codes TC1-TC11 of the video V1 shown in FIG. 1 in the manner described, the computing device 10 identifies time code breaks TCB1 without requiring any type of evaluation of the video content. Neither the computing device 10 nor a human operator needs to evaluate the video content of the video V1 in order to identify one or more time code breaks. It is also possible to eliminate the use of the adjustable variable and for the predetermined number to be permanently set by a programmer.

Before going forward with the discussion, it is pointed out that the time code break TCB1 in the video V1 shown in FIG. 1 does not include any video frames since the time code break TCB1 is merely a time code jump that occurs between the last frame F5 of the first portion P1 of the video V1 and the first frame F6 of the second portion P2 of the video V1. A time code break however could actually consist of a number of video frames in which the time codes thereof are not continuous or stable. In the video V2 shown in FIG. 4, for example, the time codes TCA6 to TCA10 of the video frames A6 to A11 are not continuous or stable. It is seen that the time code break TCBA2 extends from video frame A6 to video frame A11 and has a length of six video frames.

After the computing device 10 finds a time code break, the next step is for the computing device 10 to determine whether the portions of video located before and after the time code break are related and form part of the same video segment. The basic test used to determine whether the portions of video form part of the same video segment preferably includes two determinations or steps (a) and (b) that can be performed in any order. Step (a) involves having the computing device 10 check to see whether the actual time code of the first frame of the portion of video located after the time code break is close enough to the expected time code value. A predetermined number is used to set a limit for how much the actual time code can differ from the expected time code. If the actual time code differs from the expected time code by too much, then preferably the computing device 10 should not conclude that the portions of the video located before and after the time code break are related and form part of the same continuous video segment. In other words, the computing device 10 should preferably conclude that the portions of the video are distinct video segments. Step (b) involves having the computing device 10 examine the location of the first frame of the portion of video located after the time code break with respect to the location of the last frame of the portion of video located before the time code break. If the portions of the video located before and after the time code break are too far apart from each other, or in other words, if the time code break is too long, then the computing device 10 should not conclude that the portions of the video located before and after the time code break are related and form part of the same continuous video segment. In other words, the computing device 10 should conclude that the portions of the video are distinct video segments.

As an example, let us refer again to the video V1 shown in FIG. 1. The computing device 10 is programmed such that after finding a time code break, such as time code break TCB1 shown in FIG. 1, the computing device 10 will examine the time codes TC6-TC11 of the video frames F6-F11 located after the time code break TCB1 to determine if and where the time code starts to progress normally. In this example, the computing device 10 will determine that the time codes TC6-TC11 progress normally in the second portion P2 of the video V1. The computing device 10 is programmed such that after finding a video portion where the time codes are progressing normally, such as the second portion P2 of the video V1, the computing device 10 will determine whether the actual time code TC6 of the first frame F6 of the second portion P2, which is located after the time code break TCB1, is within a predetermined number from the expected time code of the first frame F6 of the second portion P2 of the video V1 (step (a) described above). In this example, the computing device 10 calculates the expected time code of the first frame F6 of the second portion P2 by knowing that the last frame F5 of the first portion P1 of the video V1 has a time code TC5 of five and that the time code break TCB1 contains no video frames and has a length of zero. Therefore, the computing device 10 calculates the expected time code of video frame F6 by adding one to the time code TC5 of frame F5 and adding the number of frames of the time code break TCB1 to obtain the expected time code of six (1+5+0=6). The actual time code TC6 of video frame F6 is eight. If the predetermined number is set to three, the computing device 10 will determine that the actual time code, which is eight, is within three frames of the expected time code, which is six.

It should be clear that the expected time code of the first frame of the portion of the video located after the time code break can be determined by knowing the time code of the last frame of the portion of the video located before the time code break and the number of frames, if any, which actually separate the first frame of the portion of the video located after the time code break from the last frame of the portion of the video located before the time code break (i.e. the number of frames of the time code break). The expected time code of the first frame of the portion of the video located after the time code break is determined by adding one plus the number of frames of the time code break to the time code of the last frame of the portion of the video located before the time code break.

The computing device 10 is also programmed to determine whether or not the time code break extends over too many video frames for the portions before and after the time code break to be considered to be part of the same continuous video segment (step (b) described above). In the Example shown in FIG. 1, the time code break TCB1 does not contain any video frames so the time code break TCB1 could not be considered to be too long. In step (b) the computing device 10 will determine that the time code break is not too long and the portions of the video are not too far apart. Therefore, in the example described above where the predetermined number is set to three and the comparison between the actual time code TC6 of frame F6, the expected time code, and the predetermined number is favorable (in step (a), the actual time code is acceptable), the computing device 10 will determine that the first portion P1 and the second portion P2 form part of the same continuous video segment if no additional factors are considered.

Figure 3:
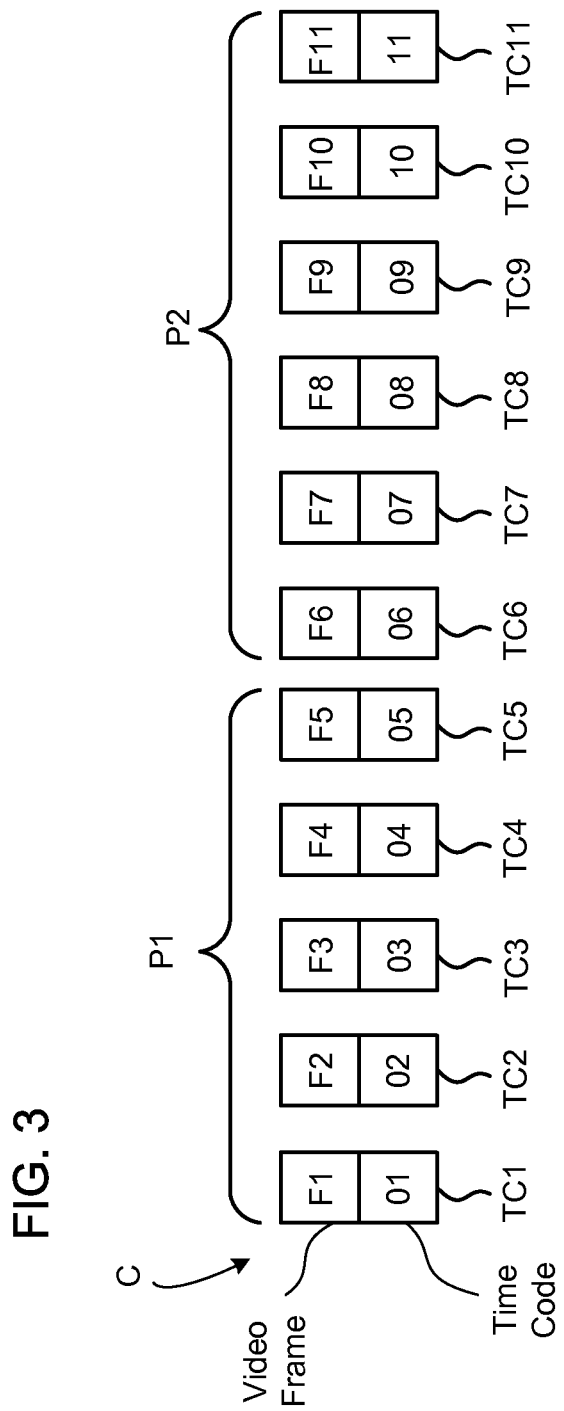
FIG. 3 is a schematic diagram of the plurality of video frames of the video of FIG. 1 rewritten with consecutive and continuous time code.

Just to be clear, even if a bit repetitious, let's refer again to the video V1 shown in FIG. 1. If the computing device 10 performs step (a) and determines that the time code TC6 of the first frame F6 of the second portion P2 of the video V1 is within a predetermined number away from the expected time code (the time code that the frame is expected to have) of the first frame F6, and if the computing device 10 performs step (b) and determines that the length of the time code break TCB1 is within another predetermined number (i.e. the time code break is not too long), the computing device 10 will classify the first portion P1 and the second portion P2 as part of the same continuous video segment if the computing device 10 is not programmed to use any additional factors or criteria to confirm the determination. The computing device 10 could then record the second portion P2 of the video V1 immediately following the first portion of the video V1 on a suitable media and also rewrite the time codes TC1-TC5 and TC6-TC11 to be consecutive and continuous from the beginning of the first portion P1 to the end of the second portion P2 as shown in FIG. 3. Thus, FIG. 3 shows a continuous video segment C, which has consecutive and continuous time codes TC1-TC11, and which is formed from the first portion P1 and the second portion P2 of the video V1 from FIG. 1.

To prevent possible confusion, let us refer to the variable storing the predetermined number used in comparing the expected and the actual time codes of the first frame of the portion of the video located after a time code break as TCVARIANCE. Let us refer to the variable storing the predetermined number that is compared with the length of the time code break as TCBMAX. Let us also refer to the variable storing the predetermined number used in identifying a time code break as TCJUMPMIN. It should be clear that the variables TCVARIANCE, TCBMAX and TCJUMPMIN are not reference characters used in the drawings. The variables TCVARIANCE, TCBMAX and TCJUMPMIN may be adjustably set to the appropriate predetermined number by the operator. Alternatively, the variables TCVARIANCE, TCBMAX and TCJUMPMIN can be permanently set by the programmer.

The computing device 10 is programmed to identify a time code break by determining whether the difference between the time codes of two adjacent video frames is greater than the predetermined number TCJUMPMIN.

Figure 4:
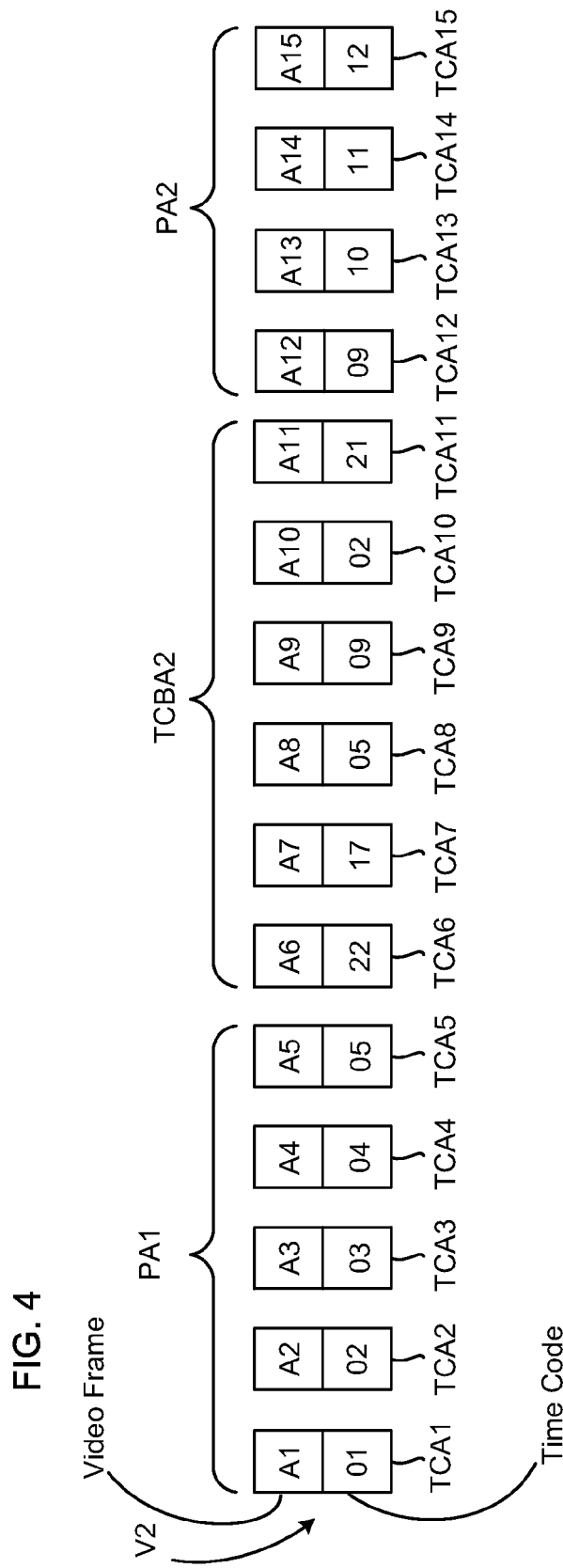
FIG. 4 is a schematic diagram of a plurality of video frames of another video.

FIG. 4 is a schematic diagram of a plurality of video frames A1-A15 of another video V2. Let us discuss another example in which the predetermined number TCJUMPMIN is set equal to 1. When the computing device 10 examines the plurality of time codes TCA1-TCA15 of the video V2, a time code break is found between video frames A5 and A6. As the computing device 10 checks the time codes TCA5-TCA11, the computing device 10 sees that there is a time code break after each video frame A5-A11. The computing device 10 determines that the time codes TCA6-TCA11 are not continuous or stable. The time codes are stable and continuous beginning with time code TCA12. The video frames A6-A11 are classified as junk frames since the time codes TCA6-TCA11 are not stable or continuous. In effect the entire video portion from video frame A6 to video frame A11 is a time code break TCBA2.

The computing device 10 next performs step (a). The computing device 10 counts the six frames of the time code break TCBA2 and knows that the time code value TCA5 of the last frame A5 of the first portion PA1 of the video V2 is five. Therefore, the expected time code value of the first frame A12 of the second portion PA2 of the video V2 is five plus six plus one which equals twelve. The actual time code value TCA12 of the first frame A12 of the second portion PA2 of the video V2 is nine. If the variable TCVARIANCE stores a predetermined number of four, the difference between the actual time code value TCA12 and the expected time code value, which is three, is less than four and step (a) is satisfied. If however the variable TCVARIANCE stores a predetermined number of two, the difference between the actual time code value TCA12 and the expected time code value, which is three, is greater than two and step (a) is not satisfied.

The computing device 10 next performs step (b) to determine whether second portion PA2 of the video V2 is close enough to the first portion PA1 of the video V2 for the portions PA1 and PA2 to be part of the same continuous video segment. The computing device 10 will check whether the number of frames of the time code break TCBA2 is less than a predetermined number. The computing device 10 counts the number of video frames of the time code break TCBA2 as six frames. If the variable TCBMAX holding the predetermined number is set to seven frames, the length of the time code break TCBA2 is acceptable (the first portion PA2 and the second portion PA2 are not too far apart) and step (b) is satisfied. The computing device 10 will determine that the portions PA1 and PA2 are part of the same continuous video segment.

If the variable TCBMAX holding the predetermined number is set to five, the computing device 10 will determine that time code break TCBA2 is too long and the portions PA1 and PA2 are too far away from each other to be part of the same continuous video segment.

The computing device 10 may optionally use additional criteria when making the determination of whether two portions of video are part of the same continuous video segment. One optional criterion is the number of consecutive video frames in a portion of video. The computing device 10 may be programmed to insure that each portion of video has at least a minimum number of consecutive video frames. If the computing device 10 determines that there are a minimum number of consecutive video frames in a particular portion of the video, the computing device 10 will classify that portion as a valid video segment that can be part of a continuous video segment. If the minimum length requirement is not met, the computing device 10 will ignore the portion and the portion will not be included as part of a continuous video segment. For example, referring to the video V1 shown in FIG. 1, the computing device 10 will check to insure that the first portion P1 of the video V1 and the second portion of the video V1 each include at least a minimum number of consecutive video frames before classifying the first portion P1 of the video V1 and the second portion of the video V1 as part of a continuous video segment and before placing the first and second portions P1 and P2 together and rewriting the time codes to be continuous.

Another optional criterion is the number of video frames with stable continuous time code in a portion of video. The computing device 10 may be programmed to insure that a portion of video has at least a minimum number of video frames with stable continuous time code. If the computing device 10 determines that there are a minimum number of video frames with stable continuous time code in the portion of the video, the computing device 10 will classify that portion as a valid video segment that can be part of a continuous video segment. If there are not enough video frames with stable continuous time code, the computing device 10 will ignore the portion and the portion will not be included as part of a continuous video segment.

Another optional criterion is the time code drift in an entire segment of video after two or more video portions are attached together, but before the time codes have been rewritten to be continuous throughout the segment. For example, referring to the video V1 shown in FIG. 1, after the computing device 10 has identified the time code break TCB1 and has performed the selected tests to determine that the first portion P1 of the video V1 and the second portion of the video V1 contain stable continuous time code, the computing device 10 will determine the time code drift of the overall video segment with video frames F1-F11. This is accomplished by comparing the time code TC11 of the last video frame F11 of the overall video segment including video frames F1-F11 with the expected time code of the last video frame F11 to see if the drift is within a predetermined time code drift limit value. The first portion P1 of the video V1 includes five video frames and the second portion of the video V1 includes 6 video frames so the expected time code of the last video frame F11 is 11 time periods. Since the time code of the last video frame F11 is 13 time periods, the time code drift will be acceptable if 2 time periods (13−11) is equal to or less than the predetermined time code drift limit value. For example, if the predetermined time code drift limit value is 8 time periods, the actual time code drift of 2 is acceptable. If the predetermined time code drift limit value is selected to be 2 time periods, the actual time code drift of 2 is still acceptable. If the time code drift is acceptable, the computing device 10 will classify the first portion P1 of the video V1 and the second portion P2 of the video V1 as part of a continuous video segment and the computing device 10 will rewrite the plurality of time codes TC1 to TC11 to be continuous from the beginning (frame F1) of the first portion P1 of the video V1 to the end (frame F11) of the second portion P2 of the video V1.

Figure 5:
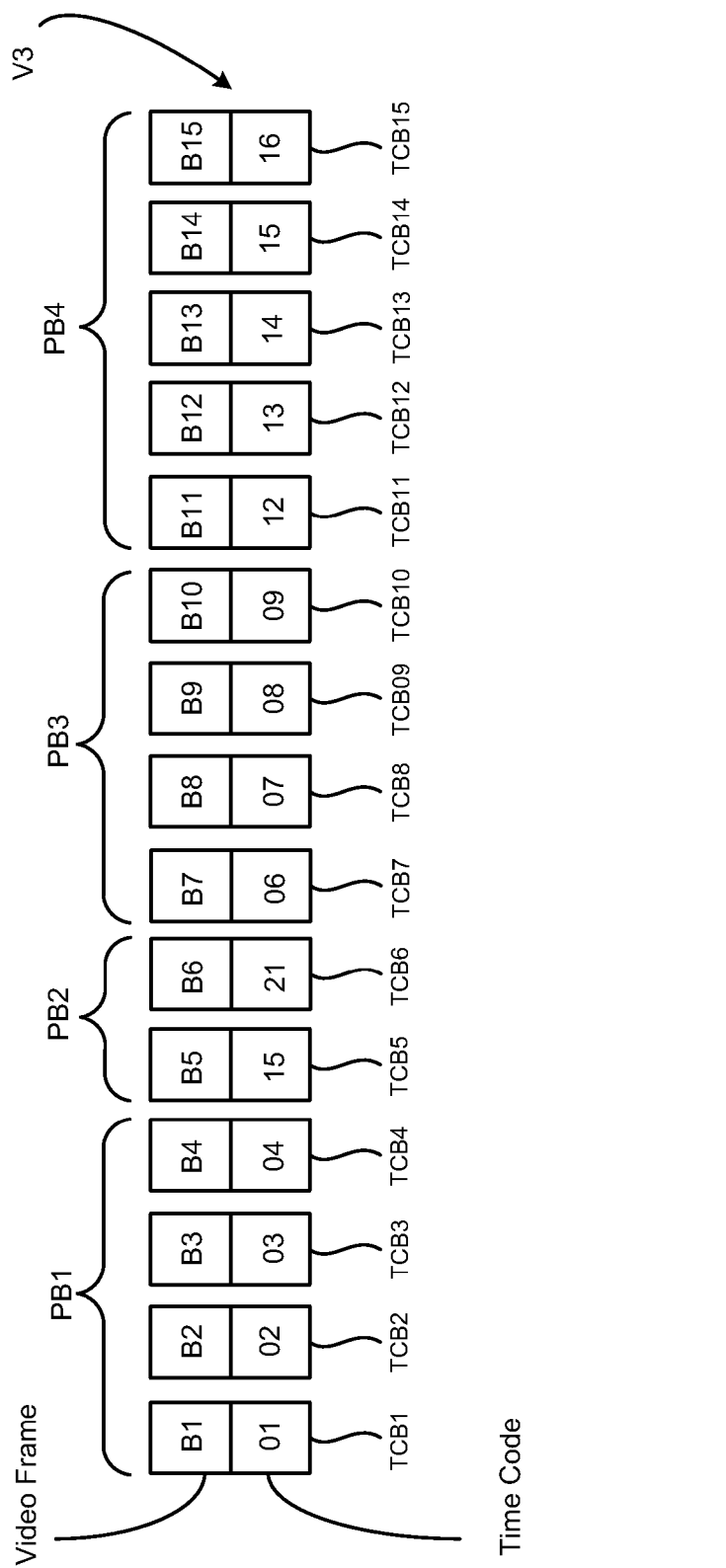
FIG. 5 is a schematic diagram of a plurality of video frames of another video.

FIG. 5 is a schematic diagram of a plurality of video frames B1-B15 of another video V3. Let us set the predetermined number TCJUMPMIN equal to one and the predetermined number TCBMAX equal to four. In this case, the computing device 10 will examine the time codes TCB1-TCB15 and identify the time code break PB2, which contains two frames of unstable code (junk frames), and a time code break between video frames B10 and B11. The computing device 10 will examine the time codes TCB1-TCB15 and determine that the portions PB1, PB3, and PB4 contain stable continuous time code. The computing device 10 will determine that the video portion PB2, which is in effect a time code break, contains two frames and is within predetermined number TCBMAX (which was set to 4) of frames, and that the video portion PB4.

The computing device 10 may be programmed to insure that each portion PB1, PB3, and PB4 of the video V3, which has stable continuous time code, has at least a minimum number of consecutive video frames. For example, if the minimum number of consecutive video frames is four, all portions PB1, PB3, and PB4 of the video V3 are acceptable. If a portion of the video were not acceptable, then it would be ignored and would not be used to form a part of the continuous video segment.

The computing device 10 may be programmed to insure that each portion PB1, PB3, and PB4 of the video V3, which has stable continuous time code, has at least a minimum number of video frames with stable continuous time code. For example, if the minimum number of video frames with stable continuous time code is three, all portions PB1, PB3, and PB4 of the video V3 are acceptable. If a portion of the video were not acceptable, then it would be ignored and would not be used to form a part of the continuous video segment.

FIG. 6 is a flow chart showing the steps of an exemplary embodiment of the computerized method 100 of determining whether portions of a video are part of a continuous video segment. The computing device 10 is programmed to perform the steps listed below. From the detailed discussion above, it should be understood that not all of the steps in the exemplary embodiment necessarily need to be performed. Step 110 includes identifying a time code break in a plurality of time codes of a video by having a computing device 10 examine the plurality of time codes of the video to determine whether the time code associated with a video frame of the video differs from the time code of a preceding video frame of the video by more than a predetermined number. Step 115 includes having the computing device 10 examine the plurality of time codes located after the time code break to find a video segment where the plurality of time codes is continuous again. Step 120 includes defining the portion of the video before the time code break as a first portion of video and defining the portion of video located after the time code break as a second portion of video. Step 125 includes determining whether a first frame of the second portion of the video is within a predetermined number of frames away from a last frame of the first portion of the video. In other words, it is insured that the time code break includes less than a certain number of frames. Step 127 includes determining whether an actual time code of a first frame of the second portion of the video is within a predetermined number away from an expected time code of the first frame of the second portion of the video. Step 130 includes insuring that the first portion of the video and the second portion of the video each have at least a minimum number of consecutive video frames. Step 135 includes insuring that the first portion of the video and the second portion of the video each have at least a minimum number of video frames with stable continuous time code. Step 140 includes appending the second portion of the video to the end of the first portion of the video. Step 145 includes insuring that the time code drift of the appended segment is within a predetermined time code drift limit value. Step 150 includes rewriting the time codes of the appended segment to be continuous from the first video frame of the first portion of the video to the last video frame of the second portion of the video thereby forming a continuous video segment.

I claim:

1. A computerized method of determining whether portions of a video are part of a same continuous video segment, the method which comprises:
   identifying a time code break in a plurality of time codes of a video by having a computing device examine the plurality of time codes of the video; and
   after identifying the time code break, determining whether a first portion of the video located before the time code break and a second portion of the video located after the time code break are part of the same continuous video segment by:
      having the computing device determine whether a first frame of the second portion of the video is within a predetermined number of frames away from a last frame of the first portion of the video, and
      having the computing device determine whether an actual time code of a first frame of the second portion of the video is within a predetermined number away from an expected time code of the first frame of the second portion of the video.

2. The method according to claim 1, which further comprises: having the computing device rewrite the plurality of time codes to be continuous from a beginning of the first portion of the video to an end of the second portion of the video.

3. The method according to claim 1, which further comprises: having the computing device rewrite the plurality of time codes to be continuous from a beginning of the first portion of the video to an end of the second portion of the video only when the computing device determines that the first portion of the video located before the time code break and the second portion of the video located after the time code break are part of the same continuous video segment.

4. The method according to claim 1, which comprises having the computing device determine that the first portion of the video located before the time code break and the second portion of the video located after the time code break are not part of the same continuous video segment when the first frame of the second portion of the video is not within the predetermined number of frames away from the last frame of the first portion of the video.

5. The method according to claim 1, which comprises having the computing device determine that the first portion of the video located before the time code break and the second portion of the video located after the time code break are not part of the same continuous video segment when the actual time code of the first frame of the second portion of the video is not within the predetermined number away from the expected time code of the first frame of the second portion of the video.

6. The method according to claim 1, wherein the step of identifying the time code break includes having the computing device determine whether a time code associated with a video frame of the video differs from a time code of a preceding video frame of the video by more than a predetermined number.

7. The method according to claim 6, wherein the predetermined number is one.

8. The method according to claim 1, wherein the step of determining whether the first portion of the video located before the time code break and the second portion of the video located after the time code break are part of the same continuous video segment includes:
   having the computing device classify the first portion of the video and the second portion of the video as part of the same continuous video segment only if a time code drift from a beginning of the first portion of the video to an end of the second portion of the video is equal to or less than a predetermined value.

9. The method according to claim 1, wherein the step of determining whether the first portion of the video located before the time code break and the second portion of the video located after the time code break are part of the same continuous video segment includes:
   having the computing device classify the first portion of the video and the second portion of the video as part of the same continuous video segment only if the first portion of the video and the second portion of the video each include at least a minimum number of video frames with a stable continuous time code.

10. The method according to claim 1, wherein the step of determining whether the first portion of the video located before the time code break and the second portion of the video located after the time code break are part of the same continuous video segment includes:
    having the computing device classify the first portion of the video and the second portion of the video as part of the same continuous video segment only if the computing device determines that the first portion of the video and the second portion of the video each include at least a minimum number of consecutive video frames.

11. A non-transient computer-readable medium having computer-executable instructions for performing the method according to claim 1.

12. A computerized method of determining whether portions of a video are part of a same continuous video segment, the method which comprises:
    identifying a time code break in a plurality of time codes of a video by having a computing device examine the plurality of time codes of the video; and
    after identifying the time code break, determining whether a first portion of the video located before the time code break and a second portion of the video located after the time code break are part of the same continuous video segment by:
        having the computing device determine whether the second portion of the video is within a predetermined number of frames away from the first portion of the video, and
        having the computing device determine whether an actual time code of a frame of the second portion of the video is within a predetermined number away from an expected time code of the frame of the second portion of the video.

13. The method according to claim 12, which further comprises: having the computing device rewrite the plurality of time codes to be continuous from a beginning of the first portion of the video to an end of the second portion of the video.

14. The method according to claim 12, which further comprises: having the computing device rewrite the plurality of time codes to be continuous from a beginning of the first portion of the video to an end of the second portion of the video only when the computing device determines that the first portion of the video located before the time code break and the second portion of the video located after the time code break are part of the same continuous video segment.

15. The method according to claim 12, which comprises having the computing device determine that the first portion of the video located before the time code break and the second portion of the video located after the time code break are not part of the same continuous video segment when the first frame of the second portion of the video is not within the predetermined number of frames away from the last frame of the first portion of the video.

16. The method according to claim 12, which comprises having the computing device determine that the first portion of the video located before the time code break and the second portion of the video located after the time code break are not part of the same continuous video segment when the actual time code of the frame of the second portion of the video is not within the predetermined number away from the expected time code of the frame of the second portion of the video.

17. The method according to claim 12, wherein the step of identifying the time code break includes having the computing device determine whether a time code associated with a video frame of the video differs from a time code of a preceding video frame of the video by more than a predetermined number.

18. The method according to claim 12, wherein the step of determining whether the first portion of the video located before the time code break and the second portion of the video located after the time code break are part of the same continuous video segment includes:
    having the computing device classify the first portion of the video and the second portion of the video as part of the same continuous video segment only if a time code drift from a beginning of the first portion of the video to an end of the second portion of the video is equal to or less than a predetermined value.

19. The method according to claim 12, wherein the step of determining whether the first portion of the video located before the time code break and the second portion of the video located after the time code break are part of the same continuous video segment includes:
    having the computing device classify the first portion of the video and the second portion of the video as part of the same continuous video segment only if the first portion of the video and the second portion of the video each include at least a minimum number of video frames with a stable continuous time code.

20. The method according to claim 12, wherein the step of determining whether the first portion of the video located before the time code break and the second portion of the video located after the time code break are part of the same continuous video segment includes:

having the computing device classify the first portion of the video and the second portion of the video as part of the same continuous video segment only if the computing device determines that the first portion of the video and the second portion of the video each include at least a minimum number of consecutive video frames.

\* \* \* \* \*